United States Patent
Pollutro et al.

(10) Patent No.: US 7,644,434 B2
(45) Date of Patent: Jan. 5, 2010

(54) COMPUTER SECURITY SYSTEM

(75) Inventors: Dennis Vance Pollutro, Clymer, NY (US); Andrew Almquist, Jamestown, NY (US)

(73) Assignee: Applied Identity, Inc., San Francisco, CA (US)

( * ) Notice: Subject to any disclaimer, the term of this patent is extended or adjusted under 35 U.S.C. 154(b) by 623 days.

(21) Appl. No.: 10/423,444

(22) Filed: Apr. 25, 2003

(65) Prior Publication Data

US 2004/0006710 A1    Jan. 8, 2004

(51) Int. Cl.
*H04L 29/06* (2006.01)

(52) U.S. Cl. .............................. 726/7; 726/6; 726/12

(58) Field of Classification Search ........................ None
See application file for complete search history.

(56) References Cited

U.S. PATENT DOCUMENTS

| | | | |
|---|---|---|---|
| 5,218,637 A | | 6/1993 | Angebaud et al. |
| 5,757,916 A | | 5/1998 | MacDoran et al. |
| 5,887,065 A | | 3/1999 | Audebert |
| 6,021,495 A | | 2/2000 | Jain et al. |
| 6,070,245 A | | 5/2000 | Murphy, Jr. et al. |
| 6,076,108 A | * | 6/2000 | Courts et al. ................ 709/227 |
| 6,105,136 A | | 8/2000 | Cromer et al. |
| 6,145,083 A | | 11/2000 | Shaffer et al. |
| 6,161,182 A | | 12/2000 | Nadooshan |
| 6,253,326 B1 | | 6/2001 | Lincke et al. |
| 6,304,969 B1 | | 10/2001 | Wasserman et al. |
| 6,345,291 B2 | | 2/2002 | Murphy, Jr. et al. |
| 6,393,569 B1 | | 5/2002 | Orenshteyn |
| 6,418,472 B1 | * | 7/2002 | Mi et al. ...................... 709/229 |
| 6,470,453 B1 | | 10/2002 | Vilhuber |
| 6,480,967 B1 | | 11/2002 | Jensen et al. |
| 6,856,330 B1 | * | 2/2005 | Chew et al. .................. 715/745 |
| 6,947,992 B1 | * | 9/2005 | Shachor ........................ 709/228 |
| 2001/0054147 A1 | | 12/2001 | Richards |
| 2002/0080822 A1 | | 6/2002 | Brown et al. |
| 2002/0133723 A1 | | 9/2002 | Tait |
| 2002/0146129 A1 | | 10/2002 | Kaplan |
| 2003/0005118 A1 | * | 1/2003 | Williams ...................... 709/225 |
| 2003/0005300 A1 | | 1/2003 | Noble et al. |

* cited by examiner

*Primary Examiner*—Jung Kim
(74) *Attorney, Agent, or Firm*—RatnerPrestia

(57) ABSTRACT

A method of providing access to an authenticated user, and restricting access to an unauthorized user, of a computer system, is provided. The method includes determining whether a user is authenticated to access at least one resource included in the computer system. The method also includes establishing a session and a session identifier such that the user has access to the at least one resource if the user is authenticated to access the at least one resource. The method also includes changing the session identifier each time the user completes an interaction with the computer system during the session.

33 Claims, 8 Drawing Sheets

COMPUTER SECURITY SYSTEM

FIELD OF THE INVENTION

This invention relates to computer system security and more particularly to a method and system for providing access to an authenticated user and restricting access to an unauthenticated user of a computer system.

BACKGROUND OF THE INVENTION

It is often desirable to control the accessibility of computer system resources that are accessible directly or through networks such as LANs, WANs, and the Internet. Recently, security and access concerns have grown as malicious trespasses have increased the desirability to have improved access control. Further, the heightened state of awareness related to threats of cyberterrorism make the desire to reduce existing vulnerabilities greater than ever before.

Conventional virtual private networks (i.e., VPNs) and firewalls allow access holes to exist. Spoofing and other cracker techniques can enter through these holes resulting in a threat to data integrity. This creates a significant level of exposure which hackers, crackers, and criminals can and do exploit.

Third party solutions exist through which information technology (IT) organizations manage their community of legitimate access; however, because these are added as point solutions on top of an existing IT structure, various global access security issues are not resolved.

Most specifically, there exists a vulnerability in existing firewalls at the transaction level. Most security solutions focus on encrypting data or authenticating access; however, the system (e.g., a computer server) is vulnerable during the time when the transactions are taking place. While transactions are in process, applications must maintain state, similar to the continually maintained state when two people talk on a telephone network. While transactions are in process, enterprise systems are susceptible to break-ins, much like a telephone wiretap break-in.

FIG. 8 is a block diagram illustration of an existing protection system. A user desires to obtain access to a resource 804 using an access point 800. For example, the resource 804 may be an application or port on a computer server or computer network. Further, access point 800 may be, for example, an Internet connection or a network connection. Between access point 800 and the desired resource 804 is firewall 802, for example, a corporate firewall.

Establishing a connection through firewall 802 may be accomplished, for example, using a user ID and/or a password. After the connection is established, the user may access resource 804; however, resource 804 (and possibly other data on the computer server or network) is vulnerable to unauthenticated access through the legitimate connection established by the user through access point 800.

Yet another drawback to existing security systems such as VPNs (i.e., Virtual Private Networks), firewalls, and proxy servers is that they typically require proprietary bundled hardware and software.

As such, it would be desirable to provide a computer security system that results in improved protection of resources stored on a computer system.

SUMMARY OF THE INVENTION

In an exemplary embodiment of the present invention, a method of providing access to an authenticated user, and restricting access to an unauthorized user, of a computer system, is provided. The method includes determining whether a user is authenticated to access at least one resource included in the computer system. The method also includes establishing a session and a session identifier such that the user has access to the resource if the user is authenticated to access the resource. The method also includes changing the session identifier each time the user completes an interaction with the computer system during the session.

In another exemplary embodiment of the present invention, a computer system is provided. The computer system includes a microprocessor and a computer readable medium. The computer readable medium includes computer program instructions which cause the computer system to implement the above-described method of providing access to an authenticated user and restricting access to an unauthorized user of the computer system.

In yet another exemplary embodiment of the present invention, a computer readable carrier including computer program instructions is provided. The computer program instructions cause a computer system to implement the above-described method of providing access to an authenticated user and restricting access to an unauthorized user of the computer system.

BRIEF DESCRIPTION OF THE DRAWINGS

Exemplary embodiments of the invention will be described with reference to the drawing, of which.

DETAILED DESCRIPTION OF THE INVENTION

Figure 1:
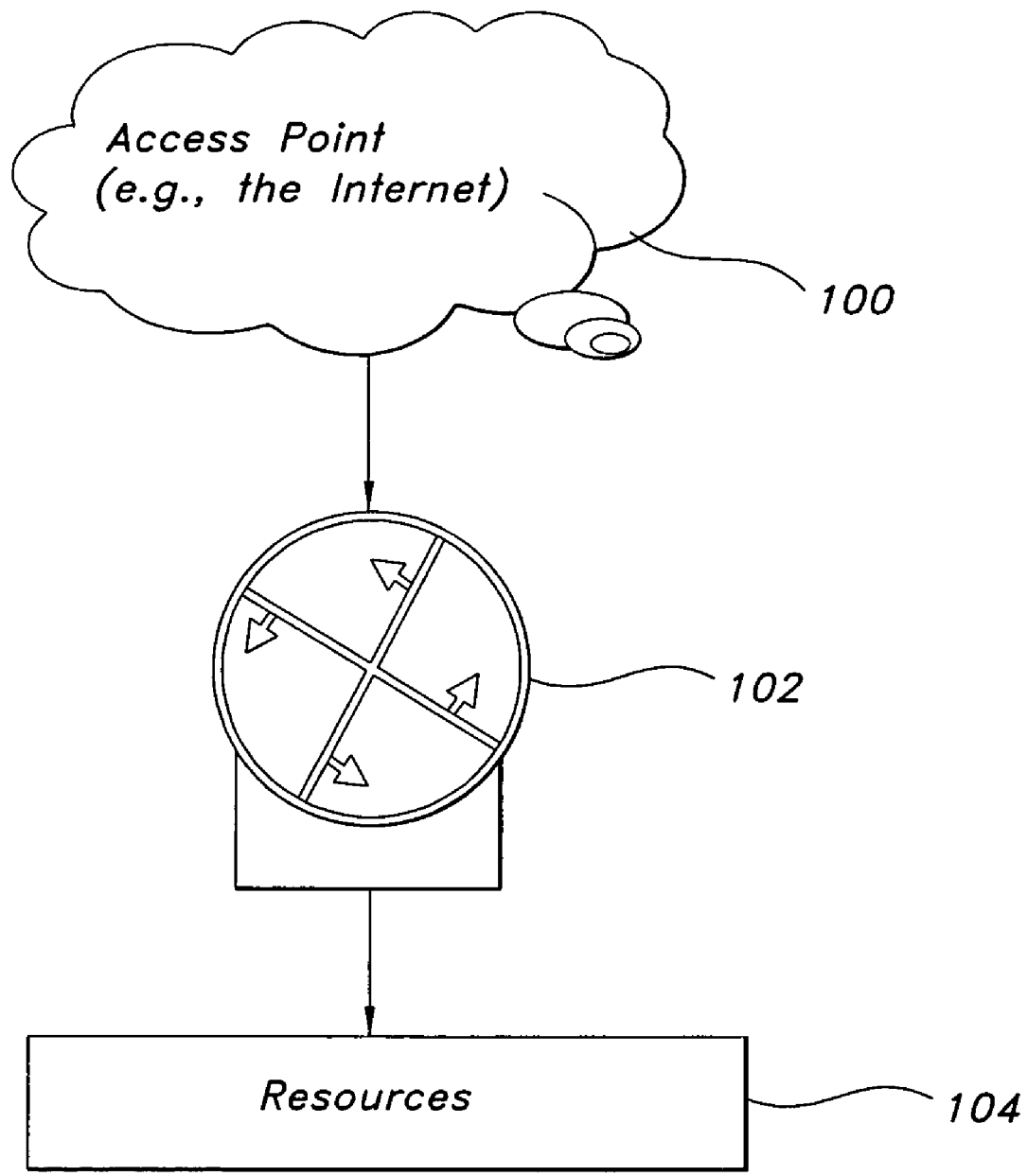
FIG. 1 is a block diagram illustrating a security system in accordance with an exemplary embodiment of the present invention.

Preferred features of selected embodiments of this invention will now be described with reference to the figures. It will be appreciated that the spirit and scope of the invention is not limited to the embodiments selected for illustration. It is contemplated that any of the embodiments described hereafter can be modified within the scope of this invention.

Through the various exemplary embodiments disclosed herein, a security system for information is provided. Additionally, methods of providing access to information, and restricting access to information, using the security system, are also disclosed. The disclosed invention is particularly suited to the security of remotely accessed network environments through a network connection though directly accessed computers are contemplated as well.

When used in conjunction with a network, the security system controls remote user access to the network (or any resource in the network) by way of, for example, a URL and/or any other access user interface. The security system acts as an umbrella over the remotely accessed network. A user of the network logs into the network before any content is accessible, or before the user may access network resources or applications (e.g., computer programs used by the user to perform some task) hosted within the network. The information stored on the user's computer after log in includes a session ID (e.g., a generic unique identifier which is used to maintain state between a client computer and a server computer over a stateless connection). The session ID contains a number or other indicia corresponding to the user's session (e.g., an invisible entity which maintains state between a client computer and a server computer).

In one embodiment, because the user can only view the origination URL, nothing within the network is exposed to the user prior to sign on (e.g., sign on enables the user to sign in once and be automatically signed into other applications when the user uses them) to the web server (e.g., a server that hosts both static and dynamic web pages). As such, after log in, if a user has permission to access resources/applications on the network, encrypted addresses to the application servers (e.g., servers that allow users to run applications residing on the server from a remote location) that include the desired resources/applications are sent to the user. This protects the addresses of application servers from being published to the entire Internet (or an access community) and substantially reduces the possibility of intrusion into the remotely accessed network.

The security system of the present invention may include a number of features to ensure that once a user (i.e., the person accessing an object) is logged in, the user only has access to what he/she has been granted access to. For example, in certain embodiments, the security system controls access to resources based on information related to user identity, group identity, permissions (i.e., rules permitting access to perform a specific action on an object), and objects (i.e., an entity that can have actions performed on it by a user). Users belong to a group, and users and groups are given permissions to access objects.

Further, a page, application, web service, or document may be used to accomplish this delegation of access privileges. Permissions to access objects are assigned to a user or to a group for an object by relating the user, group, and object together. A record giving a user access to an object may include, for example, a permission ID, a user ID (i.e., a unique identifier representing a single user), and an object ID (i.e., a unique identifier representing any object which can have permissions associated with it). Similarly, to grant a group of users the same permission, the record may contain the permission ID, the group ID (i.e., a unique identifier representing a single group of users), and the object ID. In the same way a user belongs to a group, a record exists that relates a user ID to a group ID. This allows permission to access an object to be granted to a group or to a user, while at the same time requiring permission to be granted in order for the access to be permitted.

According to aspects of the present invention, when a user attempts to access a protected object, a number of actions take place to determine what the user is permitted to do to an object. On any object and for any action, the system may first check to determine the group that the current user belongs to, and the relationship of the group to the permissions required to perform the desired action. If this check is not successful, the system may continue to determine if the user is related to the permission required to perform the action. If neither of the above cases is true, the user is denied access. If one or both cases are true, the action is performed. For example, the action could include viewing an object, modifying the content of an object, approving an object, creating an object, or deleting an object.

The security system of the present invention may use cookies and a unique ID known as a session ID to maintain state with a user over a normal connection, such as a HTTP (i.e., Hyper Text Transport Protocol) connection or a secure socket layer connection (i.e., a standard connection for communicating securely over the Internet in which all communications are encrypted using a high level of encryption). After logging into the security system a dynamic session ID is assigned that corresponds to the user, and the session ID may be stored on the client computer in the form of a cookie. The session ID cookie exists, unless dynamically changed through the completion of an interaction, until the user closes the current browser window.

A timeout feature may also be provided whereby the expiration of a predetermined period of inactivity is used to determine when the session (and the session ID) should be terminated. During the user's session, the inactivity/timeout period is continually updated. The timeout period is set in the database and if the user does not perform an action/interaction within the predetermined timeout period, the session is terminated by removing the session from a database server (i.e., a server which stores and provides access to large amounts of data efficiently). This allows a high level of security because no meaningful information is stored on the user's computer. Further, even if someone does gain access to the user's computer, after the timeout period has expired, any information that might be stored in a cookie on the user's computer is no longer valid.

In certain embodiments of the present invention, after the user has logged in, a number of checks may take place each time the user moves within the system in order to determine what resources the user can access. For example, the security system determines the identity of the user accessing the system. The session may be validated by checking the user ID against the database. If a session ID does not exist, the session is invalid, and the user is forced to log in before accessing the system. If the session ID does exist, the system retrieves the associated user ID and continues to perform whatever actions are necessary to finish displaying the approved information.

Through various exemplary embodiments, the process of accessing a resource (e.g., an application) on a remote server begins with the user logging into the security system (e.g., logging in using single sign on software that logs the user directly into the security system). Once logged in, the user can click links to applications hosted on the application server and view objects. This takes the user to a URL which hosts a component (i.e., a compiled application which can be made accessible to a script within the web browser) that connects to the application server, and the user is also provided with a unique token that provides a single use link to the application server. Another component of the system connects back to the web server with the token and retrieves the connection information for the application server. This component provides the retrieved information back to the application server client component which then connects to the application server. The application server then displays all objects and applications approved for the user.

The security system described herein preferably includes an architecture that utilizes common programming languages. This security system contemplates the desire to provide secure access to all remote applications, software, and content. The security system also contemplates and provides embodiments that do not require an install of the services on the remote users device.

By utilizing common industry standards, the security system architecture can provide an efficient and meaningful security solution without the overhead of extra or robust hardware. As illustrated herein, the security system architecture can operate with any number of application services or terminal services installed either on the local physical server, or in a configuration utilizing outside objects from remote servers or locations. By aggregating these objects the end user is provided with desirable services defined by their current role in one location with a reduced investment in hardware. This architecture allows for different and interchangeable service delivery options. The system provides the end user with access to the services for which they have been granted access. As such, a more productive end user specific service is provided that, while unique to each and every user, also contemplates and mitigates the security risks associated with remote access to a multiple user network (e.g., a corporate network).

The security system of the present invention may be implemented in a number of mediums. For example, the system can be installed on an existing computer system/server as software. Further, the system can operate on a stand alone computer system (e.g., a security server) that is installed between another computer system (e.g., an application server) and an access point to the another computer system. Further still, the system may operate from a computer readable carrier, e.g., a computer readable storage medium (such as solid state memory, optical disc, magnetic disc), radio frequency carrier medium, audio frequency carrier medium, etc. that includes computer instructions (e.g., computer program instructions) related to the security system.

Referring to the figures generally, in an exemplary embodiment of the present invention, a method of providing access to an authenticated user, and restricting access to an unauthorized user, of a computer system, is provided. The method includes a step 200 of determining whether a user is authenticated to access at least one resource included in the computer system. The method also includes a step 202 of establishing a session and a session identifier such that the user has access to the at least one resource if the user is authenticated to access the at least one resource. The method also includes a step 204 of changing the session identifier each time the user completes an interaction with the computer system during the session.

In another exemplary embodiment of the present invention, a computer system is provided. The computer system includes a microprocessor and a computer readable medium. The computer readable medium includes computer program instructions which cause the computer system to implement the above-described method of providing access to an authenticated user and restricting access to an unauthorized user of the computer system including steps 200, 202, and 204.

In yet another exemplary embodiment of the present invention, a computer readable carrier including computer program instructions is provided. The computer program instructions cause a computer system to implement the above-described method of providing access to an authenticated user and restricting access to an unauthorized user of the computer system including steps 200, 202, and 204.

Referring now to FIG. 1, a block diagram of a computer security system in accordance with an exemplary embodiment of the present invention is illustrated. In FIG. 1, a user desires to access resource 104 via access point 100. For example, resource 104 may be an application, data file, or any other data stored on a computer system, a computer server, or a network. Access point 100 may be an Internet connection, or any other direct or indirect connection to the system (e.g., a network connection).

Access point 100 is connected to resource 104 through "revolving door" 102. Revolving door 102 is a visualization of a component that distinguishes various exemplary embodiments of the present invention from traditional session management systems. As opposed to issuing a session ID to a user that is carried for the duration of the connection with the system (e.g., computer device, server, OS, etc.) the user is granted a session ID that dynamically changes with each interaction with the system. Revolving door 102 can be visualized as being in the firewall, and as such, the revolving door approach described herein provides security for transactions at the session and port level within the firewall.

As used herein, the term interaction is meant to define any of a number of actions that a user may cause with the host computer system. For example, an interaction may be a mouse-click, a keystroke, or may even relate to movement of the mouse. As such, an interaction between the user and the computer system may be any action by the user through an input/output device (e.g., mouse, keyboard, joystick, video device, audio device, touch device, etc.).

As used herein, the term computer system is meant to define any of a number of computer systems or microprocessor based devices. For example, a computer system may be a personal computer, a mainframe computer, a computer server system, a computer network, a PDA, an appliance that is microprocessor based, etc.

Additionally, the session management system discussed herein may also include a timeout limit for a session. In such an embodiment, if an interaction does not occur between the user and the computer system (or a resource on the computer system) within a specified time, the existing session ID is eliminated and the user is required to re-authenticate him or herself.

More specifically, a user may connect to the computer system by way of access point 100, where access point 100 is a client or a clientless (e.g., a web browser) interface. For example, a user wishing to access a resource on a computer system is challenged with a request for authentication. This authentication data provided by the user may be referenced against a data source (e.g., external to the computer system, internal to the computer system, or included on another memory source) that may include the credentials of this specific user. If the user is validated against the data source, the user is assigned a unique identifier and a session ID is generated. In an exemplary embodiment, the session ID and the unique identifier have continuity (mathematically match up) at all times or the user will lose the established connection. In the event that the established connection is terminated, the user may be redirected to the authentication area of the system. The session ID changes with each and every interaction (e.g., each click of the mouse). Because the session ID is dynamic in nature, an extra level of security is added to the protected resource on the computer system.

Each time the user completes an interaction with the computer system, the session ID changes, and the unique identifier is again referenced by way of a reference check made to the data source. The resulting correlation of the session ID, the unique user identifier, and the data source information provides the system with a positive or negative result to either grant the user continued access (by continually providing updated session IDs) or to force the user to re-authenticate with the computer system.

The unique user identifier and the dynamic session ID may be generated, for example, using a process by which a unique, random number or other indicia is generated. For example, a unique, random number may be generated using a random number generator, or by using a unique logarithmic code generation method.

The data referenced in the data source may also be generated using the processes described above in relation to the unique user identifier and the session ID (i.e., random number generator, logarithmic code, etc.). Further, the data referenced in the data source may also be provided a third party authentication system. The process used to match up the unique user identifier and the session ID with the data source queries is accomplished using a cross reference process where all three key components are matched, whereby a positive or negative result is generated for the particular transaction.

The timeout process described above may be accomplished by checking the last received transaction of the user against a set timeout period. When a communication is received, the system checks to see if the time elapsed between communications with the current user is greater than the predetermined timeout period. If the calculated time exceeds the timeout period, the communication with the computer system is blocked, the established session is destroyed, and the user must re-authenticate before being permitted to access any resources on the computer system.

Figure 2:
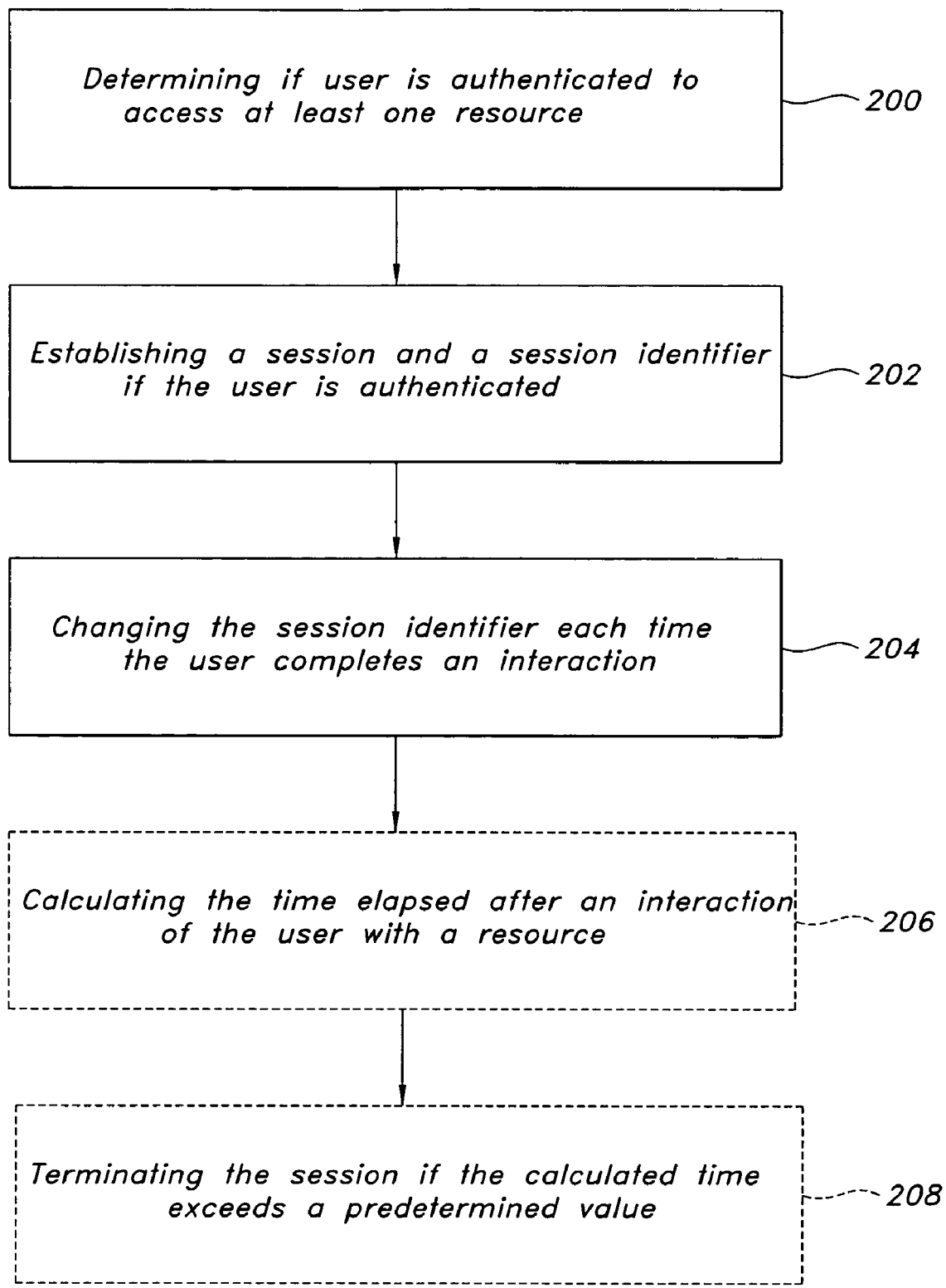
FIG. 2 is a flow diagram illustrating a method of providing and restricting access to at least one resource on a computer system in accordance with an exemplary embodiment of the present invention.

FIG. 2 is a flow diagram illustrating a method of providing access to an authenticated user, and restricting access to an unauthorized user, of a computer system. At step 200, a determination is made as to whether a user is authenticated to access at least one resource included in the computer system. If the user is authenticated at step 200, a session and a session identifier are established at step 202 such that the user has access to the at least one resource in the computer system. At step 204, the session identifier changes each time the user completes an interaction with the computer system during the session. At optional step 206, the time after an interaction between the user and the computer system, but before another interaction, is calculated. If the calculated time exceeds a predetermined value, the session is terminated at optional step 208.

Figure 3:
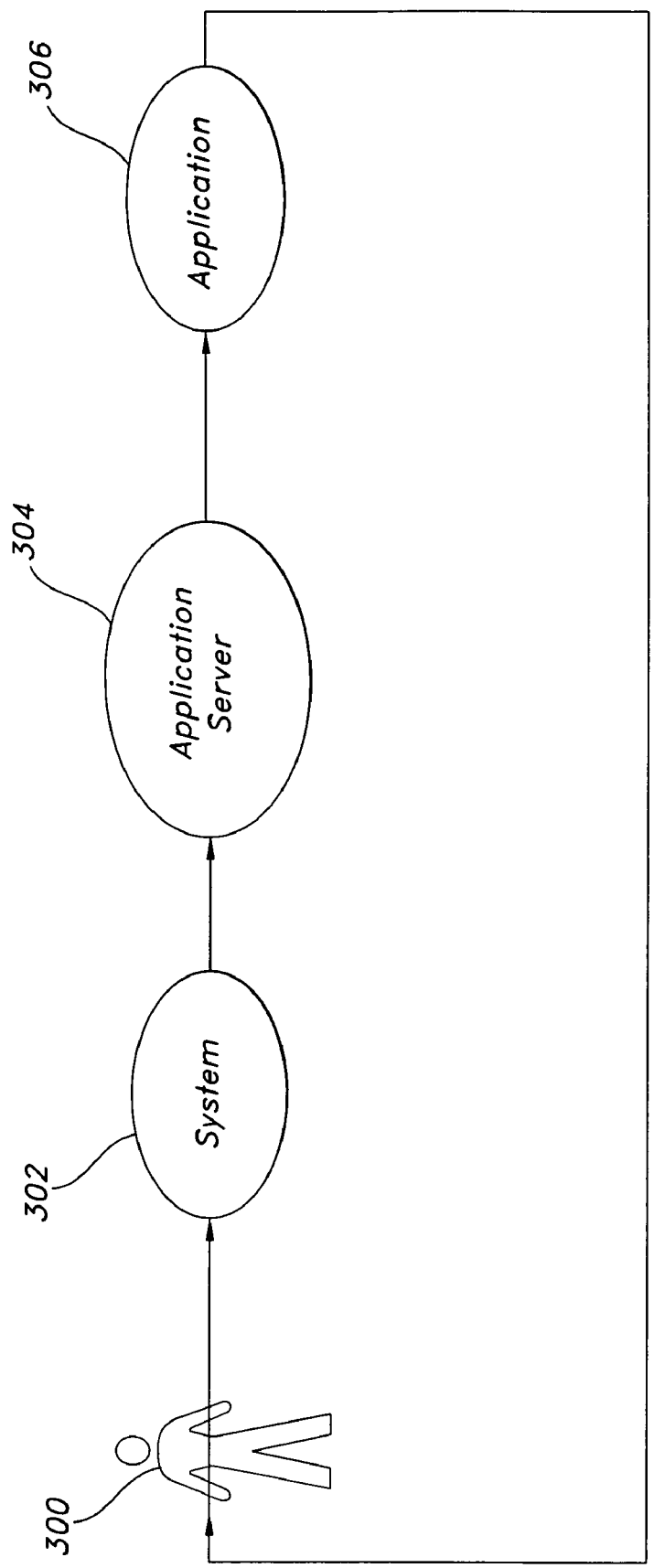
FIG. 3 is a block diagram illustrating a connection between a user and an application in accordance with an exemplary embodiment of the present invention.

FIG. 3 is a block diagram illustrating an exemplary embodiment of the present invention through which a connection between a user 300 and an application 306 is established. User 300 is able to use security system 302 by connecting to security system 302 and performing an authentication process. Until the authentication process is complete, user 300 can not access application server 304 or the desired application 306. Once the user has connected to system 302 and completed the authentication process, security system 302 accesses application server 304, thereby permitting the user to access application 306 using a client component, that is specific to application server 304, on his/her computer.

According to an exemplary embodiment of the present invention, user 300 uses a web browser (not illustrated) to connect to security system 302. According to another embodiment, user 300 may utilize a specialized client which handles interactions with security system 302, where the specialized client authenticates user 300 without requesting login information from the user. For example, the specialized client may use information that is gathered from the user when the user logs into his/her own system. In such an embodiment, it is also possible to use an application client (i.e., an application that runs on the client computer, connects directly to the application server, and allows the client to use the applications available on the application server) rather than a component to access the applications (e.g., application 306) on application server 304. An application client is different from an application component in that an application component is run in a web browser, where an application client may execute freely from a web browser.

Figure 4:
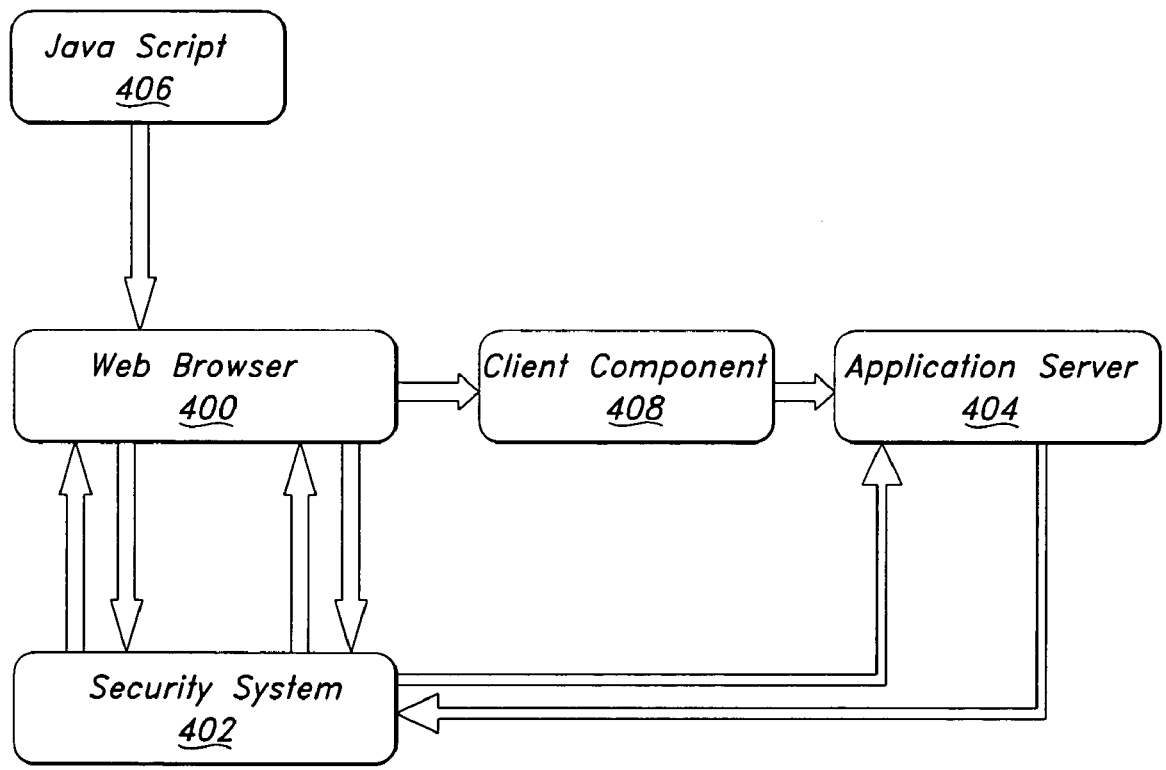
FIG. 4 is a block diagram of an application security model in accordance with an exemplary embodiment of the present invention.

FIG. 4 is a block diagram illustrating an exemplary application security model. The application security model illustrates how a resource (e.g., an application) on an application server can be protected from unauthorized access using an embodiment the security system of the present invention. Using web browser 400, a client who desires to access a resource on application server 404 connects to security system 402 to request the desired resource. Security system 402 connects to application server 404 to determine if the user has authorized access to the desired resource. Application server 404, through a connection to security system 402, validates that the user has access to the resource. Security system 402 then sends the information used to open the application to web browser 400 (e.g., a single use token and an application page to the client through web browser 400).

The client requests application connection information from security system 402 using the single use security token. Security system 402 removes the valid single use token from a list of valid tokens and sends the requested connection information back to the client at web browser 400 in the form of a script such as a JavaScript 406 (i.e., a script that is run by the web browser, that is, the client tool used to view web pages to perform a specific task). JavaScript 406, for example, sets values in web browser 400 that are needed to connect to application server 404. Script 406 may alternatively be, for example, an HTML script, an XML script, or any other type of script. JavaScript 406 instructs the client through web browser 400 to establish a connection to application server 404. Client component 408, within web browser 400, connects to application server 404 and displays the requested resource such as an application (e.g., loads the application in the client's browser window).

As described above, the client could be a web browser (e.g., web browser 400), or could be a client that handles the authentication to the web server. In such an embodiment, the client automatically logs the user into system 402 using information obtained when the user logged into his/her computer. The user can then use a client application that does not need to viewed in a web browser to connect to resources on application server 404.

Figure 5:
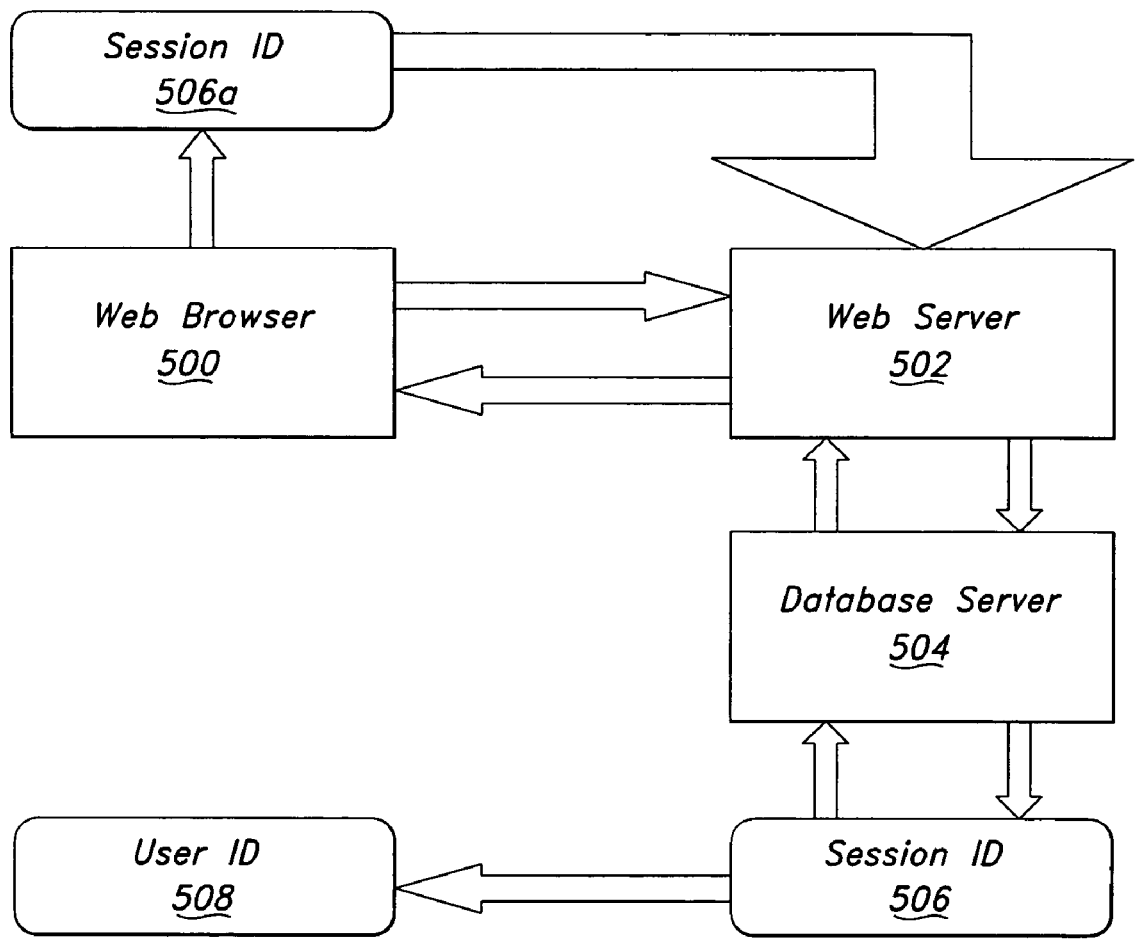
FIG. 5 is a block diagram illustrating data flow of a session based security system in accordance with an exemplary embodiment of the present invention.

FIG. 5 is a block diagram session based security model illustrating how various elements related to the security system of the present invention interact with each other. In the embodiment illustrated in FIG. 5, the security system is built into web server 502. A user uses a client (e.g., web browser 500) to request a resource such as a document (e.g., that is accessible via a URL) from web server 502. The security system, built into web server 502, checks to see if the user is presently logged in. If the user is not logged in, a login page is returned to the user (through web browser 500) by web server 502. The user, through web browser 500, fills out the login form and submits it back to the security system built into web server 502. The security system then authenticates the user, and creates a unique session identifier 506 (i.e., session ID) for the user, and stores session ID 506 in database server 504. Session ID 506 is also associated with a user specific identifier, user ID 508.

The security system then sends the user, through web browser 500, a web page (i.e., a graphical page of information that is displayed by a web browser) containing the requested content (a resource such as an application) as well as a cookie containing session ID 506. Once the user, with user ID 508, has been authenticated and assigned session ID 506, every request that the user makes to the web server 502 using web browser 500 contains the last session ID 506 (e.g., in the form of a cookie) that was associated with user ID 508.

At the next transaction, the security system, built into web server 502, compares session ID 506*a* with the session ID 506 stored in database server 504 in order to verify, through user ID 508, that the user has been authenticated. The security system then compares the last time the user accessed the server to the current time to determine if session ID 506 has expired.

In an exemplary embodiment of the present invention, a session ID expires if 15 minutes have elapsed since the last time the user accessed the server (i.e., since the last interaction). If session ID 506, as well as the corresponding session, has expired, web server 502 sends the login page back to the user through web browser 500. If session ID 506 has not expired, web server 502 creates a new session ID 506 to send to the user through web browser 500. This new session ID will be sent to the user through web browser 500 with the next response from web server 502.

In the exemplary embodiment of the present invention illustrated in FIG. 5, web server 502 could be any type of server, for example, a network server. Web browser 500 could be a specialized network client designed to handle session ID 506, and to automatically pass session ID 506 on to the security system, built into web server 502.

As opposed to web browser 500 (i.e., the actual client application) illustrated in FIG. 5, in embodiments where another type of network server is utilized, a client application specific to that network server could be used as the client (assuming that either a web browser or specialized client were used to perform the authentication and to maintain the session).

As opposed to being built into web server 502 as illustrated in FIG. 5, the security system could be a separate computer system between the client (e.g., web browser 500) and web server 502. Further still, the security system could be a separate server on the same machine as web server 502.

Figure 6:
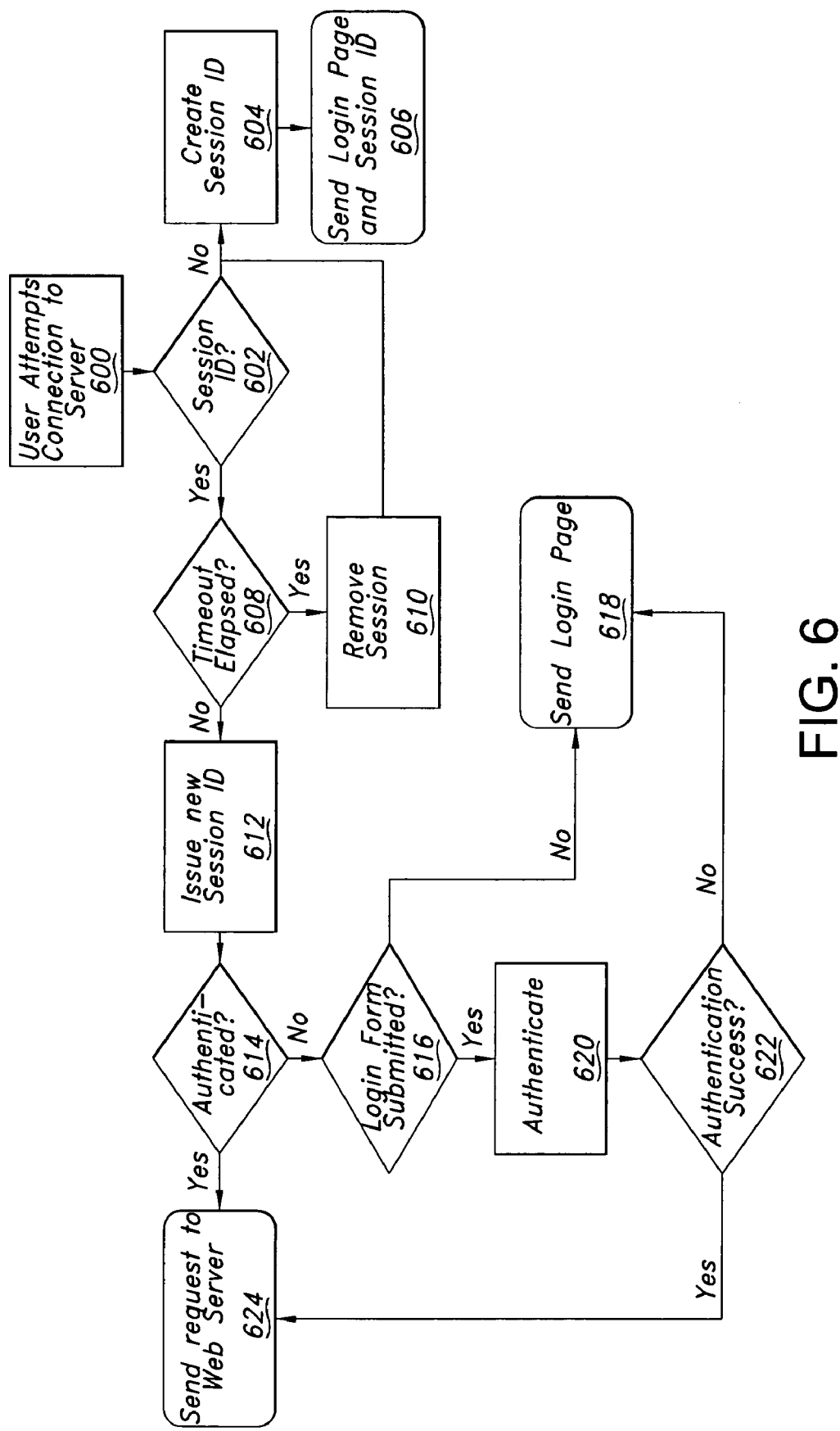
FIG. 6 is a flow diagram illustrating a computer system security process in accordance with an exemplary embodiment of the present invention.

FIG. 6 is a flow chart illustrating an exemplary embodiment of the system security process. The process begins at step 600 when a user attempts to connect to the some resource (e.g., on a server) protected by the security system. At step 602 the security system determines whether the user has already been assigned a session ID. If the session (and a corresponding session ID) does not exist, the security system creates a session ID at step 604, and sends a login page along with the session ID to the user at step 606. At this point the user could then again attempt to connect to a resource that is protected by the security system, as at step 600.

If the user does have a valid session ID (e.g., a valid single use token), the security system determines whether the session ID has expired at step 608. The inactivity period (timeout period) may be set to any predetermined duration (or a variable duration), for example, the session ID may expire if there is more than 15 minutes between interactions. If the session ID has expired, the security system will remove the session at step 610, and then return to step 604 to create a new session.

If the session ID has not elapsed based on inactivity between the user and the computer system, the security system will issue a new session ID at step 612, and then determine if the user has been authenticated at step 614. If the user has been authenticated, a request is sent to the web server at step 624. After step 624, the user will receive a response from the web server (enabling access to the desired resource, such as an application), and the user's client (e.g., web browser) will be updated with the new session ID.

If it is determined that the user has not been authenticated at step 614, the security system determines if the user has submitted the appropriate login form for authentication at step 616. If the appropriate login form has not been submitted, the security system sends the appropriate login page to the user at step 618. If the user did submit the appropriate login page, the user is authenticated at step 620. If the authentication of the user is successful at step 622, the request is sent to the web server at step 624, and the results are returned to the user with the new session ID. If the authentication fails at step 622, the user is sent the login page along with the new Session ID at step 618.

As with the previously described embodiments, the web server that receives the requests after authentication of the client is verified could be any type of server, such as a network server. Again, the user's client could be any type of client, for example, a web browser, or a client that is designed to maintain the session ID on the user's machine. In an embodiment where the security system sends requests or packets to a server other than a web server, the format of the information being sent to this other server could be changed. The remaining aspects of the security system in these alternative exemplary embodiments would function as described by reference to FIG. 6.

Through the various exemplary embodiments disclosed herein, the security system of the present invention may be used as a stand-alone security system. Alternatively, the security system may complement existing VPNs, firewalls, and proxy servers.

Figure 7:
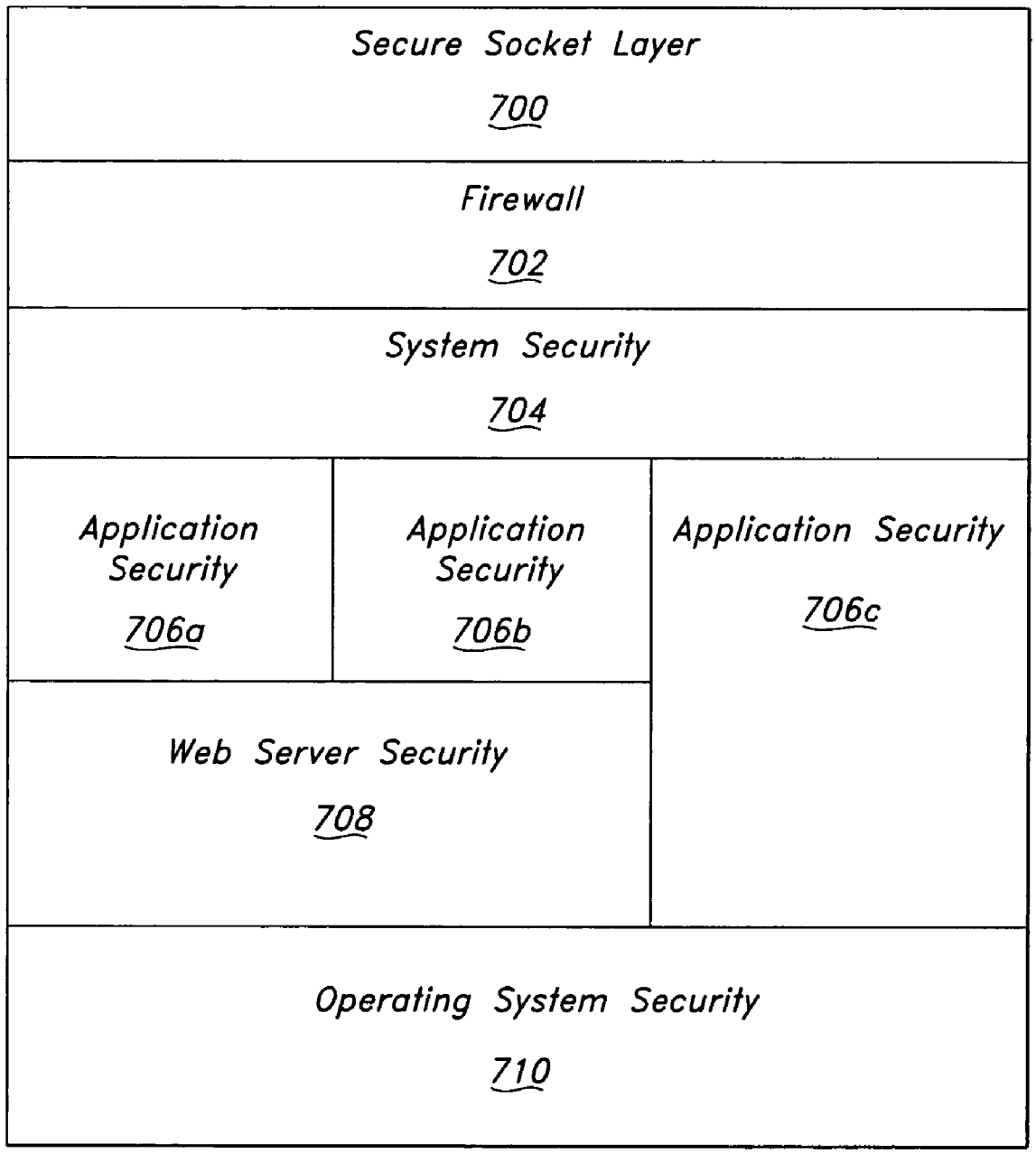
FIG. 7 is a block diagram illustrating a layered security model in accordance with an exemplary embodiment of the present invention.
Figure 8:
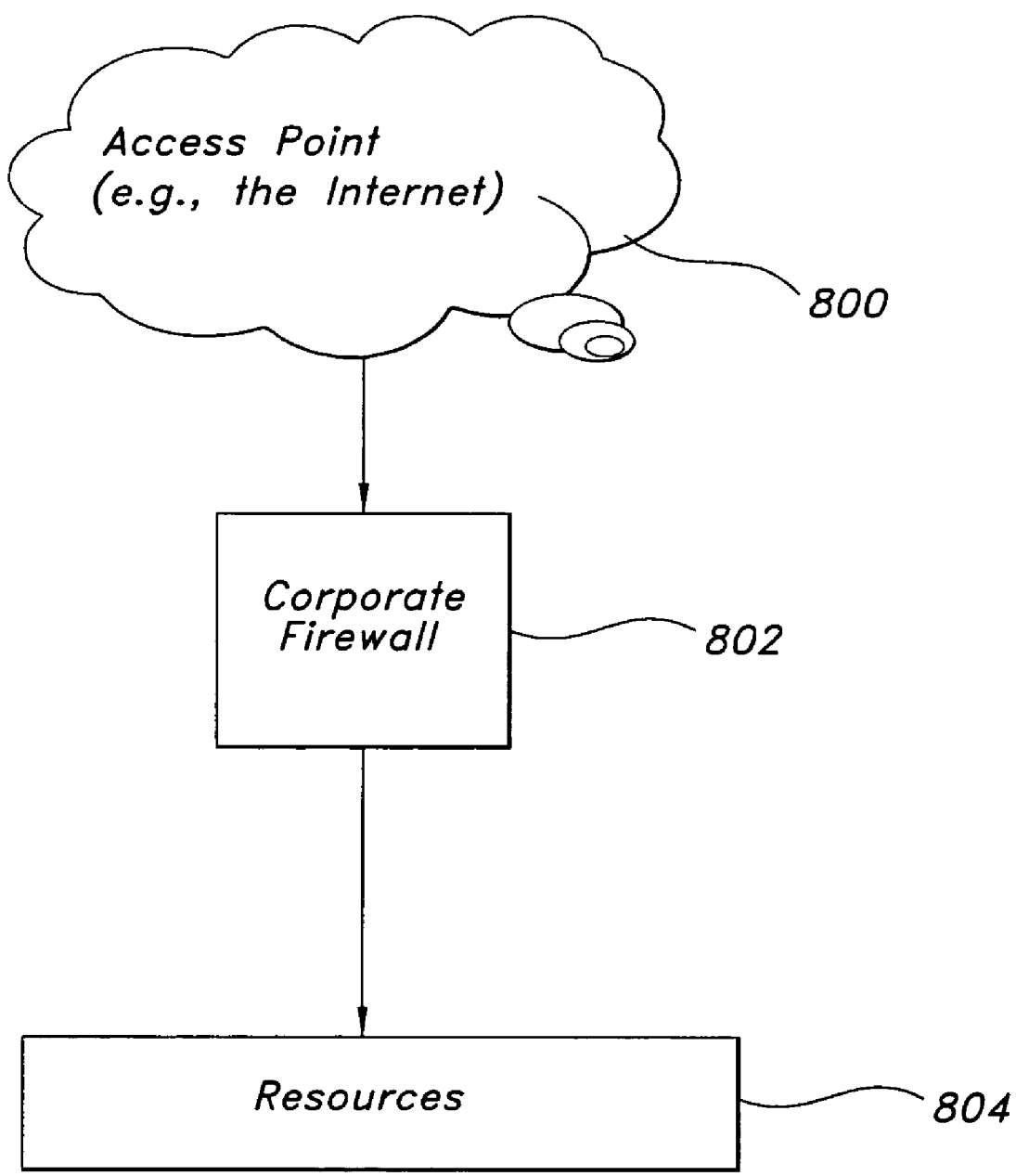
FIG. 8 is a block diagram illustrating a prior art security system.

For example, FIG. 7 is a block diagram of a layered security model that includes the security system of the present invention. The exemplary layered structure illustrated in FIG. 7 provides an overview of the process flow of requests for a resource such as a application from a user through numerous security layers. The requests are first decrypted at secure socket layer 700 (i.e., the request, for example, from a client browser, is carried through an SSL connection). The requests then proceed through firewall layer 702 (i.e., a physical device which limits access to the internal network). Firewall layer 702 filters out requests that are not allowed to be received by the network.

Once through firewall layer 702, the requests are evaluated by security system layer 704 of the present invention, as defined by at least one of the exemplary embodiments described herein. Security system layer 704 determines if a request can be allowed to continue past this layer of the security model based on the criteria described herein. As such, security system layer 704 authenticates all incoming and outgoing communications. If security system layer 704 permits a user's request for access to a resource (e.g., an application) to pass through the security system, the request is received by at least one of application security layers 706*a*, 706*b*, and 706*c* (i.e., security enforced within an application). Application security layer 706 corresponds to the application related to the request made by the user. For example, if the user requests access to a given application, or a resource included in a given application, the application may include an independent security level 706. Application security layers 706, 706*b*, and 706*c* illustrate that the user may request access to one of a number of applications.

If the application is a web based application, a further security layer may be enforced by the web server at web server security layer 708 (i.e., security enforced by a web server). Finally, the operating system may enforce its own security, as the web server or application attempts to perform operations within the operating system, at operating system security layer 710 (i.e., security enforced by an operating system). For example, operating system security layer 710 determines which files on the server may or may not be accessed by a particular user.

Although the security system of the present invention (i.e., system security layer 704) is illustrated in FIG. 7 as part of a multi-layer security model, such a configuration is not required. System security layer 704 may be used as a stand alone security layer, or may be used in combination with any other security system. As such, in the embodiment illustrated in FIG. 7, system security layer 704 may be used with any combination of the additional security layers illustrated.

The security system (and the methods of providing and restricting access to resources) disclosed herein have diverse applicability in a range of markets including financial services, horizontal wireless LAN (e.g., wireless sales-force automation and contractor services), and government regulated markets such as banking, healthcare, and HIPPA. However, these are merely exemplary applications: the present invention is not limited thereto.

Although this invention has been described with reference to a user having a web browser client, it is not limited thereto. All potential users, with varying access capabilities, fall under the umbrella of the present invention. As such, access control is substantially the same for both internal users (i.e., fixed line users as in a LAN), and external users (e.g., remote or wireless users). As described above, this is accomplished by suspending the state of transaction so that the firewall port is closed using a dynamic session ID (i.e., the revolving door).

Although the present invention has been largely described in terms of a user attempting to connect to an application on an application server, it is not limited thereto. As described herein, for example, the present invention may be embodied in software, in a machine (e.g., a computer system, a microprocessor based appliance, etc.) that includes software in memory, or in a computer readable carrier configured to carry out the protection scheme, e.g., in a self contained computer readable storage medium (i.e., silicon device, a solid state memory, an optical disc, a magnetic disc), a radio frequency carrier medium, an audio frequency carrier medium, etc.). Further, when the present invention is embodied in a user connecting to a remote system to access a resource, the remote system is not limited to an application server, and the resource is not limited to an application on an application server. As described herein, the remote system may be any remotely accessible microprocessor based device (e.g., a PDA, a personal computer, a network server, etc.), and the resource may be any resource installed on (or accessible through a connection to) the remotely accessible device.

It will be appreciated that other modifications can be made to the illustrated embodiments without departing from the scope of this invention, which is separately defined in the appended claims.

What is claimed:

1. A method of providing individual access to each of a plurality of protected physical resources on a network, said method comprising the steps of:
   establishing a security system physically intermediate to a user access point and the plurality of protected physical resources on the network;
   determining, by the security system, whether a user is authenticated to connect to an individual one or individual ones of the plurality of protected physical resources on the network to establish physical access by the user to the individual one or individual ones of the plurality of protected resources on the network;
   establishing, by the security system, a client identifier and a session identifier, transparent to the user access point and the security system, to enable a session for establishing a connection between the user access point and the individual one or individual ones of the plurality of protected physical resources, if the user is authenticated by the security system for physical access to the individual one or individual ones of the plurality of protected physical resources;
   changing the session identifier each time the user completes an interaction during the session, each changed session identifier being derived from a user identifier corresponding to the authenticated user;
   determining, by the security system, whether the session identifier received with the interaction is derived from the user identifier and whether the received session identifier and the user identifier correlate to data included in a data source accessible by the security system, as the session identifier is changed;
   providing, by the security system, the user physical access to the individual one or individual ones of the protected physical resources by establishing the connection therebetween if the received session identifier is associated with the user identifier and the received session identifier and the associated user identifier correlate to the data included in the data source; and
   terminating the connection between the user and the individual one or individual ones of the protected physical resources by disabling the connection therebetween, if the received session identifier is not derived from the user identifier or the received session identifier and the associated user identifier do not correlate to the data included in the data source.

2. The method of claim 1 further comprising the steps of:
   calculating the time elapsed after each interaction of the user during the session; and
   terminating the session upon the calculated time exceeding a predetermined value.

3. The method of claim 1 wherein the data source is within or is associated with the security system.

4. The method of claim 1 further comprising the steps of:
   assigning the user identifier to the user if the user is authenticated to physically access the individual one or individual ones of the plurality of protected physical resources.

5. The method of claim 4 wherein said assigning step includes randomly generating the user identifier.

6. The method of claim 4 wherein said assigning step includes generating the user identifier according to a logarithmic code.

7. The method of claim 1 further comprising the step of:
   sending the user a single use security token useful for physically accessing the individual one or individual ones of the plurality of protected physical resources if the user is authenticated to access the individual one or individual ones of the plurality of protected physical resources.

8. The method of claim 7 further comprising the steps of:
   verifying that the single use security token is associated with a presently valid session identifier; and
   the step of providing the user with physical access to the individual one or individual ones of the plurality of protected physical resources is responsive to the verifying of an association between the single use security token and the presently valid session identifier.

9. The method of claim 8 comprising the step of:
removing the single use security token from a list of valid security tokens on the security system after said verifying step and prior to said providing the user with physical access to the individual one or individual ones of the plurality of protected physical resources.

10. The method of claim 8 wherein said providing step includes sending connection information to the user in a form of a script.

11. The method of claim 8 wherein said providing step includes sending the user a cookie containing the session identifier associated with the user and useful for physically accessing the individual one or individual ones of the plurality of protected physical resources.

12. The method of claim 1 wherein said establishing step includes randomly generating the user identifier.

13. The method of claim 1 wherein said establishing step includes generating the user identifier according to a logarithmic code.

14. The method of claim 1 wherein said determining step includes:
providing login information related to the user to a web browser;
transmitting the login information from the web browser to the security system; and
determining whether the user is authenticated to physically access the individual one or individual ones of the plurality of protected physical resources using the login information.

15. A computer system comprising;
a microprocessor; and
a computer readable medium executing on the microprocessor and including computer program instructions which cause a security device to implement a method of providing individual, physical access to each of a plurality of protected physical resources, the security device being physically intermediate to a user access point and the plurality of protected physical resources on a network, the method comprising the steps of:
determining, by the security device, whether a user is authenticated to connect to an individual one or individual ones of the plurality of protected physical resources to establish physical access by the user to the individual one or individual ones of the plurality of protected resources on the network;
establishing a client identifier and a session identifier, transparent to the user access point and the security system, to enable a session for establishing a connection between the user access point and the individual one or individual ones of the plurality of protected physical resources, if the user is authenticated by the security device for physical access to the individual one or individual ones of the plurality of protected physical resources;
changing the session identifier each time the user completes an interaction during the session, each changed session identifier being derived from a user identifier corresponding to the authenticated user;
determining, by the security device, whether the session identifier received with the interaction is derived from the user identifier and whether the received session identifier and the user identifier correlate to data included in a data source accessible by the security device, as the session identifier is changed;
providing, by the security device, the user physical access to the individual one or individual ones of the protected physical resources by establishing the connection therebetween if the received session identifier is associated with the user identifier and the received session identifier and the associated user identifier correlate to the data included in the data source; and
terminating the connection between the user and the individual one or individual ones of the protected physical resources by disabling the connection therebetween, if the received session identifier is not derived from the user identifier or the received session identifier and the associated user identifier do not correlate to the data included in the data source.

16. The computer system of claim 15 wherein the method further comprises the steps of:
calculating the time elapsed after each interaction of the user during the session; and
terminating the session upon the calculated time exceeding a predetermined value.

17. The computer system of claim 15 wherein the security device is selected from the group consisting of a personal computer, a mainframe computer, a computer server system, a computer network, a PDA, and a microprocessor based appliance.

18. A physical computer readable storage medium storing computer program instructions which cause a computer to implement a method of providing individual, physical access to each of a plurality of protected physical resources using a security device physically intermediate to a user access point and the plurality of protected physical resources on a network, the method comprising the steps of:
determining, by the security device, whether a user is authenticated to connect to an individual one or individual ones of the plurality of protected physical resources to establish physical access by the user to the individual one or individual ones of the plurality of protected resources on the network;
establishing a client identifier and a session identifier, transparent to the user access point and the security system, to enable a session for establishing a connection between the user access point and the individual one or individual ones of the plurality of protected physical resources, if the user is authenticated by the security device for physical access to the individual one or individual ones of the plurality of protected physical resources;
changing the session identifier each time the user completes an interaction during the session, each changed session identifier being derived from a user identifier corresponding to the authenticated user;
determining, by the security device, whether the session identifier received with the interaction is derived from the user identifier and whether the received session identifier and the user identifier correlate to data included in a data source accessible by the security device, as the session identifier is changed;
providing, by the security device, the user physical access to the individual one or individual ones of the resources by establishing the connection therebetween if the received session identifier is associated with the user identifier and the received session identifier and the associated user identifier correlate to the data included in the data source; and
terminating the connection between the user and the individual one or individual ones of the resources by disabling the connection therebetween, if the received session identifier is not derived from the user identifier or the received session identifier and the associated user identifier do not correlate to the data included in the data source.

19. The computer readable storage medium of claim 18 wherein the method further comprises the steps of:
calculating the time elapsed after each interaction of the user during the session; and
terminating the session upon the calculated time exceeding a predetermined value.

20. The computer readable storage medium of claim 18 wherein the physical computer readable medium is selected from the group consisting of a packaged silicon device, a solid state memory, an optical disc, and a magnetic disc.

21. The method of claim 1, wherein the interaction is selected from the group consisting of a mouse-click, a keystroke, a mouse movement, a joystick action, a video command, an audio command, a touch screen command, and a keypad command.

22. A method of providing access to an authenticated user of a client device using a server device that is intermediate to the client device and a plurality of protected resources, the client and server devices, each using multi-layer security including a firewall layer, a security system layer and an application layer, said method comprising the steps of:
establishing the server device physically intermediate to a client device and the plurality of protected physical resources on a network;
authenticating, by the security system layer of the server device, a user request to connect to an individual one or individual ones of the plurality of protected physical resources on the network to establish physical access by a user to the individual one or individual ones of the plurality of protected resources on the network;
establishing a client identifier and a session identifier, transparent to the client device and the security system, to enable a session and to establish a connection between the client device and the individual one or individual ones of the plurality of protected physical resources;
verifying, by the firewall layer of the server device, that the session identifier is derived from a user identifier associated with the authenticated user;
determining, by the firewall layer of the server device, whether the user request is authorized to physically access the individual one or individual ones of the plurality of protected physical resources, if the session identifier is verified in the verifying step;
establishing physical access to the individual one or individual ones of the protected physical resources by the user by establishing the connection therebetween, if the user request is authorized in the determining step;
communicating, by the user via the application layer of the server device different from the system security and firewall layers, with the individual one or individual ones of the plurality of protected physical resources after the physical access is established in the establishing physical access step; and
changing, by the system security layer of the server device, the session identifier responsive to predetermined interactions during a session.

23. The method of claim 1, wherein:
the user identifier and the session identifier are mathematically matched to each other as the session identifier is changed such that the step of determining includes verifying that the session identifier and the user identifier received from the user are mathematically matched to each other and correlate to the data included in the data source.

24. The method of claim 23, wherein:
for each of the interactions,
changing a value of the session identifier to a new value mathematically based on a value of the user identifier;
sending, to the data source, the new value of the session identifier; and
verifying that: (1) the new value of the session identifier is mathematically based on the user identifier received from the user and (2) the changed session identifier and user identifier correlate to the data included in the data source.

25. The method of claim 1, wherein, for each interaction, the step of changing the session identifier occurs prior to providing physical access to any protected physical resource on the network.

26. The method of claim 1, further comprising:
for each interaction between the user and the security system, maintaining physical access to the individual one or individual ones of the protected physical resources via the connection between the user access point and the individual one or individual ones of the protected physical resources if the received session identifier associated with a respective interaction is authenticated to the user.

27. The method of claim 1, further comprising:
establishing the connection between the user access point and the individual one or individual ones of the protected physical resources by maintaining a session between the user access point and the security system as long as the received session identifier is associated with the user identifier and the received session identifier and the associated user identifier correlate to the data included in the data source, as the received session identifier changes.

28. The method of claim 1, wherein:
the changing of the session identifier includes removing the received session identifier from a list of valid session identifiers in the data source; and thereafter,
the providing, by the security system, of physical access includes sending, by the security system, a script to the user access point to establish connection parameters for the physical connection between the user access point and the individual one or individual ones of the plurality of protected physical resources on the network.

29. The method of claim 1, wherein the establishing of the connection between the user access point and the individual one or individual ones of the plurality of protected physical resources includes controlling a port to the individual one or individual ones of the plurality of protected physical resources.

30. The method of claim 1, wherein the protected physical resources include one or more of a computer, a server or a network.

31. The method of claim 1, wherein the establishing of the client identifier and the session identifier includes generating the client identifier and the session identifier to be transparent to only the user access point and the security system.

32. A method of providing individual physical access to a plurality of protected physical resources on a network using a multi-layer protocol including an application layer and one or more layers beneath the application layer, said method comprising the steps of:
establishing a security system physically intermediate to a user access point and the plurality of protected physical resources on the network for connecting the user access point to an individual one or individual ones of the protected physical resources via the security system;

for each interaction between a user and the security system, determining, at one of the layers beneath the application layer by the security system, whether the user is authenticated for physical access to an individual one or individual ones of the plurality of protected physical resources on the network;

generating and sending a single use token different from a previously sent single use token to the user access point from the security system, the single use token including a client identifier and a session identifier, transparent to the user access point and the security system, such that the user has physical access to connect the user access point to the individual one or individual ones of the plurality of protected physical resources, if the user is authenticated by the security system to access the individual one or individual ones of the plurality of protected resources;

determining, at the one of the layers beneath the application layer by the security system, whether the session identifier in the single use token received from the user access point is authenticated by the security system, as the session identifier is changed;

providing, by the security system, physical access to the individual one or individual ones of the plurality of protected physical resources if the received session identifier corresponding to a respective interaction is associated with the user identifier and the received session identifier and the associated user identifier correlate to the data included in the data source; and terminating the physical access, when any one of the received session identifiers associated with one of the interactions by the user is not derived from the user identifier or the received session identifier and the associated user identifier do not correlate to the data included in the data source.

33. The method of claim 32, further comprising:

executing, on a client system, a client application to process interactions between the user and the security system without using a web browser.

* * * * *